W. H. WHITNEY.
SURVEYING INSTRUMENT.
APPLICATION FILED JUNE 4, 1908.
916,238.
Patented Mar. 23, 1909.
3 SHEETS—SHEET 1.
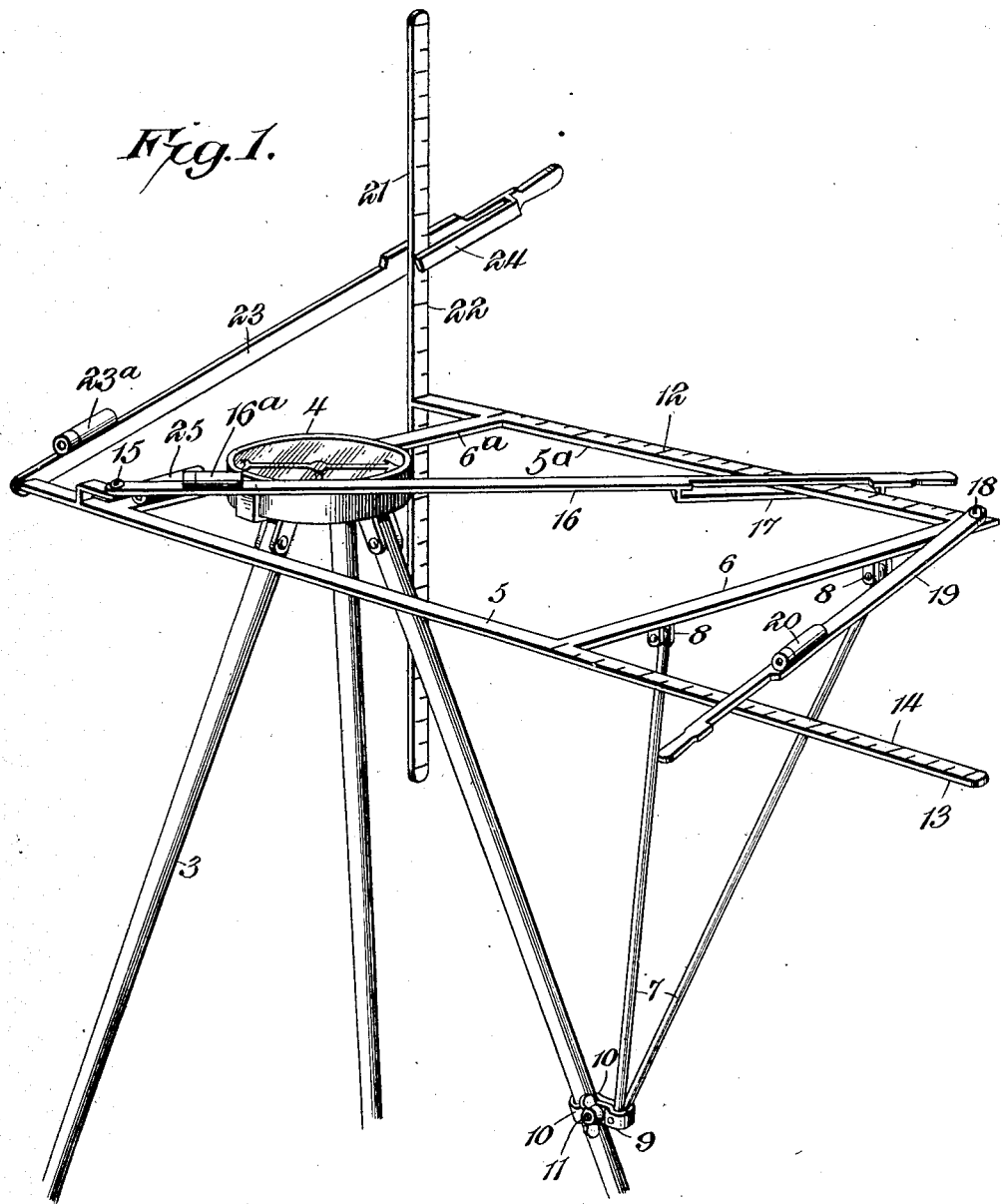

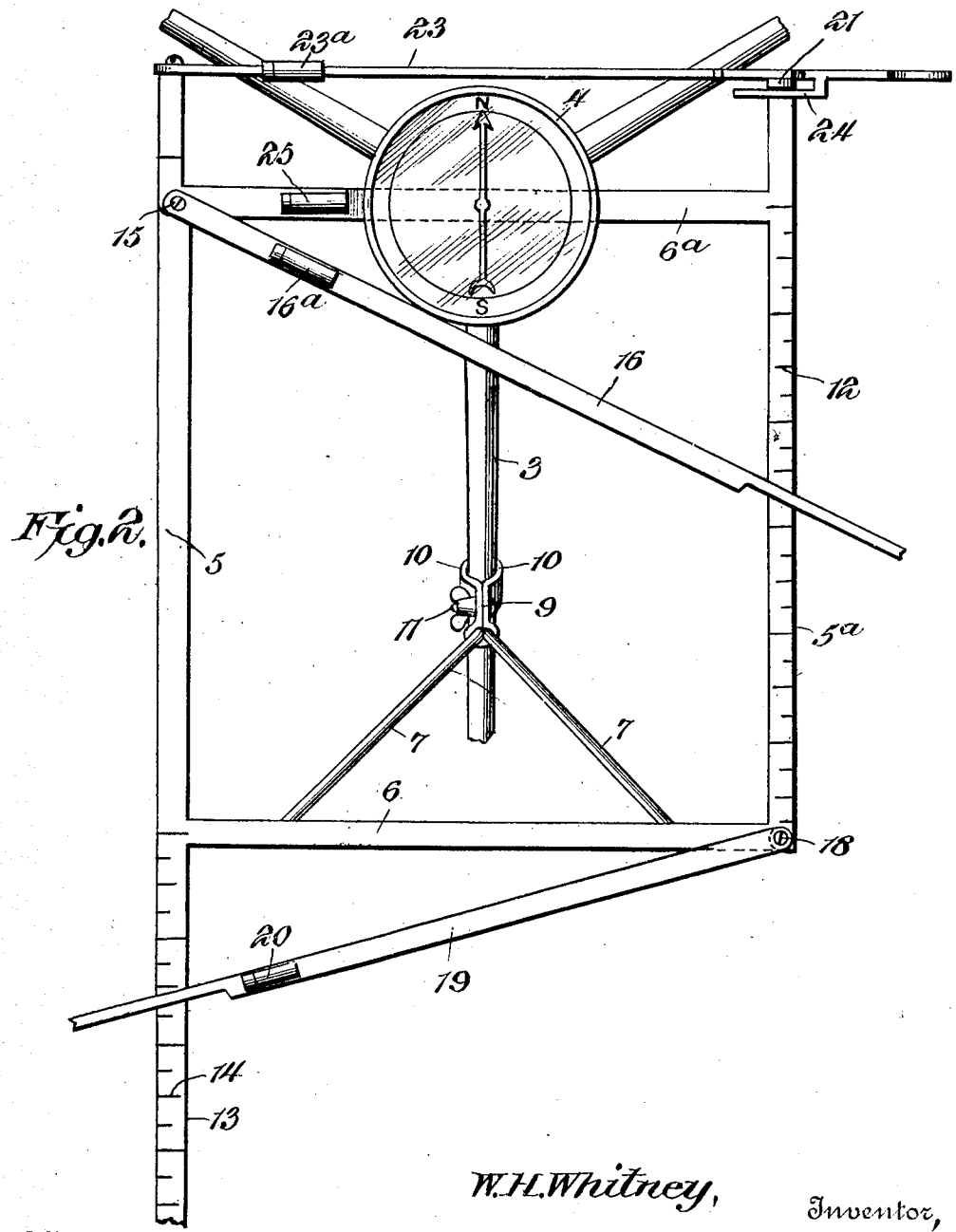

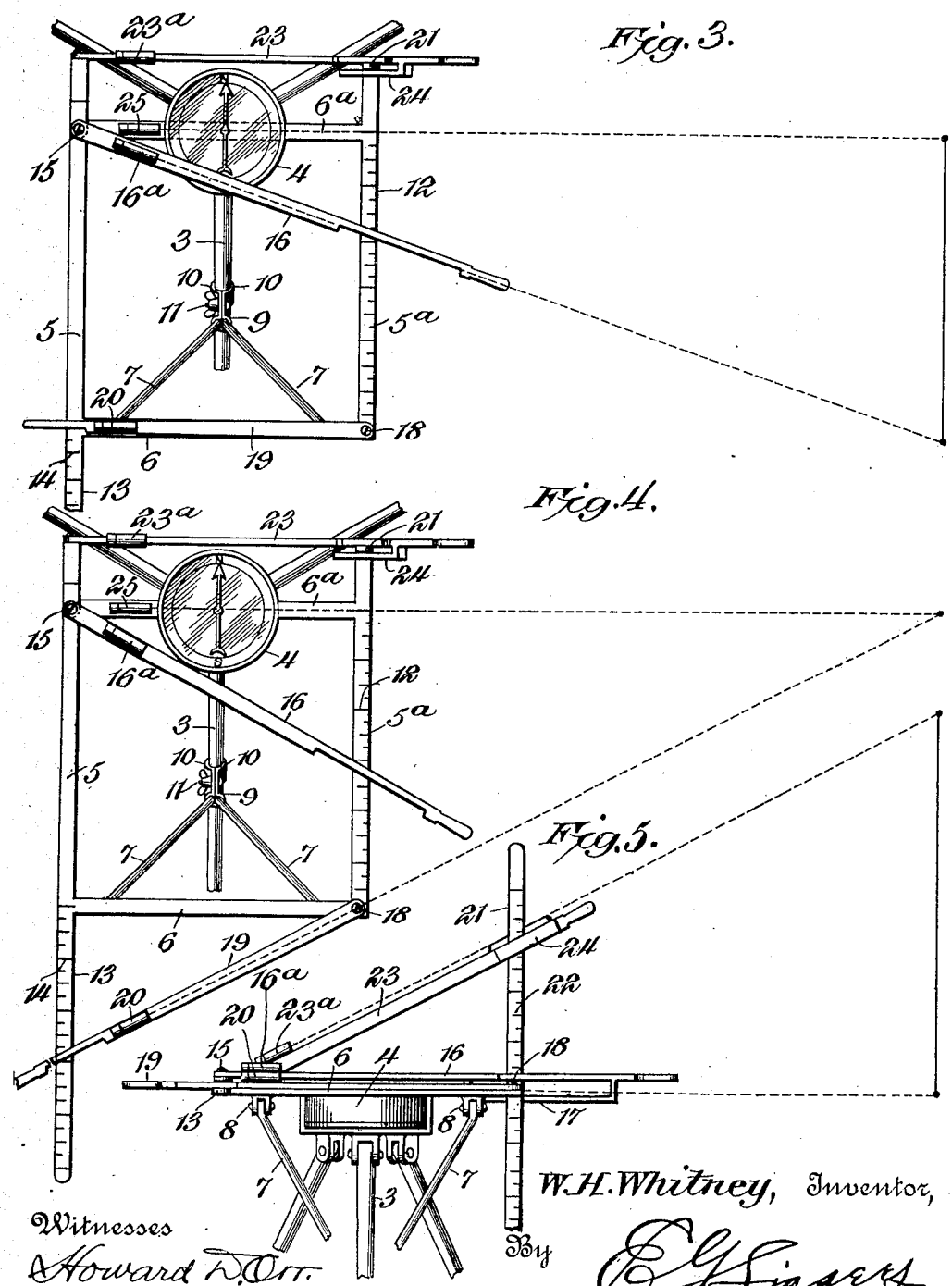

UNITED STATES PATENT OFFICE.

WILLIAM H. WHITNEY, OF KEWANEE, ILLINOIS, ASSIGNOR OF ONE-HALF TO BEN J. ORENDORFF, OF KEWANEE, ILLINOIS.

SURVEYING INSTRUMENT.

No. 916,238.　　　　Specification of Letters Patent.　　Patented March 23, 1909.

Application filed June 4, 1908.　Serial No. 436,719.

*To all whom it may concern:*

Be it known that I, WILLIAM H. WHITNEY, a citizen of the United States, residing at Kewanee, in the county of Henry and State of Illinois, have invented a new and useful Surveying Instrument, of which the following is a specification.

The primary object of the present invention is to provide novel, simple and inexpensive means whereby distances, altitudes, and the like may be readily ascertained by means of triangulation without the necessity of actually measuring said distances by chains or other analogous instruments.

An embodiment of the invention that is at present considered the preferable one is illustrated in the accompanying drawings, wherein:—

Figure 1 is a perspective view of the instrument. Fig. 2 is a top plan view of the same. Fig. 3 is a plan view of my instrument as used to determine the distance between two separated points from a third point; Fig. 4 is a plan view of the instrument arranged to determine the distance from the instrument to a distant object; Fig. 5 is a plan view showing the instrument arranged for determining altitudes of distant objects.

Similar reference numerals designate corresponding parts in all the figures of the drawings.

In the embodiment illustrated, a tripod 3 is employed, on the upper end of which is mounted a compass 4. Also secured to the upper end of said tripod, is an angular frame comprising spaced parallel bars 5 5$^a$ connected by cross bars 6 6$^a$. One of the end bars is secured to the tripod, and consequently the frame extends to one side of said tripod. In order to properly support the other end of the frame, convergently disposed brace rods 7 are provided hinged at their upper ends, as shown at 8 to the cross bar 6 and having their lower ends secured to a clamp 9 that is provided with sections 10 embracing one leg of the tripod. These sections are secured together by a suitable clamping nut 11. It will thus be evident that the frame is supported in substantially a horizontal position. One of the side bars 5$^a$ is provided between the cross bars 6, 6$^a$, with a longitudinally disposed linear scale 12. The other bar has an extension 13 projecting beyond the cross bar 6 provided with a longitudinally disposed linear scale 14.

Pivoted to the inner end of the bar 5, as shown at 15, is a sighting rod 16, the opposite end portion of which slides over the scale 12 and is maintained in associated relation with the bar carrying said scale by a keeper 17. This bar carries a sighting glass 16$^a$. Pivoted to the outer end of the other bar 5$^a$, as shown at 18, is another sighting bar 19, the free portion of which operates over the extension 13, and consequently over the scale 14 carried thereby. This bar 19 is provided with a suitable sighting glass 20.

On the rear inner corner of the frame is suitably mounted a vertical guide rod 21 that extends above and below the frame, and has a longitudinally disposed linear scale 22. Pivoted on the opposite inner corner of the frame is a vertically swinging sighting rod 23 that operates alongside the vertical guide rod 21 and has a keeper 24 coöperating therewith and a sighting glass 23$^a$ thereon. A sighting glass 25 is preferably mounted on the inner cross bar of the frame.

With this construction, it will be evident that distances and altitudes can be readily calculated, for the horizontal sighting bars 16 and 19 in connection with the cross bars 6 can be employed for determining the angles, and the sighting arms 16 and 19 coöperating with their scales, the lengths of the different legs of right triangles can be ascertained. In like manner the vertically swinging sighting arm 23 can be employed for altitudes or depressions, as will be evident to those skilled in the art.

In Fig. 3 my instrument is shown as applied to determining the distance between two objects, both of which are distant from the observer. The scales 12, 14, 22, are shown as divided into inches, though it will be apparent that this scale of divisions is not necessary. The distance is found by directing the telescope on the bar 6$^a$ on one of the objects and the telescope on the movable arm 16$^a$ on the other of the objects. The distance between one of the objects from the instrument is now to be divided by the length of the cross bar 6$^a$, in the instance shown, six inches, and the product is multiplied by the notation on the scale. Thus if the distance from the instrument to the point A is a thousand feet, this amount is divided by six inches (the length of the perpendicular 6$^a$) and the product multiplied by two being the notation on the inch scale 12, thus giving 333.33 + feet, as the answer.

When the instrument is used as shown in Fig. 4 for determining the distance of an object, the cross bar 6ª is directed toward the object and the sight arm 19 is swung until it points toward the object. The notation shown on the scale 14 is then added to the length of the bar 5 (to secure the base), and this is divided by the notation on the scale. The distance between the pivotal point 18 and the base is then multiplied by this product, which gives the required distance.

In Fig. 5 the altitude of an object is being determined, the distance being known. In this case the known distance is divided by the distance between the pivot of arm 23 and the scale 24, this being in this instance six inches. The product is then multiplied by the notation on the scale, which will give the required height of the object.

From the foregoing, it is thought that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a surveying instrument of the character set forth, the combination with a supporting frame including spaced bars having scales disposed longitudinally along the same, of means for supporting the frame, and a pair of swinging sighting arms, each arm being pivoted to one bar and capable of swinging along the scale of the other bar.

2. In a surveying instrument of the character set forth, the combination with a rectangular supporting frame including spaced parallel bars having scales disposed longitudinally along the same, of means for supporting the frame, a swinging sighting arm pivoted on the end of one bar and movable along the scale of the other bar, and another swinging sighting arm pivoted on the end of the other bar and movable along the scale of the first mentioned bar.

3. In a surveying instrument of the character set forth, the combination with a frame, of means for supporting said frame, an upstanding guide rod carried by the frame and having a scale, said rod extending above and below the frame, a sighting arm pivoted on the frame and coöperating with the rod and scale, and a keeper carried by the arm and engaging the rod.

4. In a surveying instrument of the character set forth, the combination with a tripod, of a supporting frame mounted thereon and extending to one side of the tripod, a brace secured to the frame and having a clamp that engages a leg of the tripod, and sighting mechanism mounted on the frame.

5. In a surveying instrument of the character set forth, the combination with a tripod, of a frame mounted at one end of the tripod, convergently disposed braces pivoted at their upper ends to the other end of the frame, a clamp secured to the lower ends of the braces and detachably engaging with one leg of the tripod, and sighting means mounted on the frame.

6. In a surveying instrument of the character set forth, the combination with a tripod, of an angular frame mounted at one end on the tripod and including parallel bars having longitudinally disposed scales thereon, brace rods pivoted to the frame, a clamp connected to the lower ends of the brace rods and detachably engaging a leg of the tripod, sighting arms pivoted respectively on the parallel bars and swinging over the scales thereof, an upright guide rod having a scale thereon, and a vertically swinging sighting arm pivoted to the frame and coöperating with the guide rod.

In testimony, that I claim the foregoing as my own, I have hereto affixed my signature in the presence of two witnesses.

WILLIAM H. WHITNEY.

Witnesses:
CARLOS R. MINER,
J. E. FISCHER.